(12) United States Patent
Wigmore et al.

(10) Patent No.: US 9,557,919 B2
(45) Date of Patent: Jan. 31, 2017

(54) RESOLVING WRITE PRESSURE USING EXISTING BACKUP APPLIANCE AS ADDITIONAL PRIMARY STORAGE

(71) Applicant: EMC Corporation, Hopkinton, MA (US)

(72) Inventors: Ian Wigmore, Westborough, MA (US); Stephen D. Smaldone, Woodstock, CT (US); Marik Marshak, Newton, MA (US); Alexander Veprinsky, Brookline, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 27 days.

(21) Appl. No.: 14/752,614

(22) Filed: Jun. 26, 2015

(65) Prior Publication Data
US 2016/0378349 A1 Dec. 29, 2016

(51) Int. Cl.
*G06F 3/06* (2006.01)

(52) U.S. Cl.
CPC ........... *G06F 3/0607* (2013.01); *G06F 3/0647* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 3,293,613 | A * | 12/1966 | Gabor | G06K 1/12 710/60 |
| 6,549,992 | B1 * | 4/2003 | Armangau | G06F 11/1456 707/999.202 |
| 2002/0184441 | A1 * | 12/2002 | Wong | G06F 12/123 711/113 |
| 2004/0111443 | A1 * | 6/2004 | Wong | G06F 11/1435 |
| 2005/0288010 | A1 * | 12/2005 | Kobayashi | H04N 21/23406 455/425 |
| 2006/0212668 | A1 * | 9/2006 | Furukawa | G06F 11/2064 711/162 |
| 2010/0042795 | A1 * | 2/2010 | Uchida | G06F 3/0619 711/162 |

* cited by examiner

*Primary Examiner* — Kevin Verbrugge
(74) *Attorney, Agent, or Firm* — Blakely, Sokoloff, Taylor & Zafman LLP

(57) ABSTRACT

A system for resolving write pressure includes a primary storage unit, a backup storage unit, and a processor. The primary storage unit comprises a primary storage unit input buffer and a volume storage unit. The backup storage unit comprises a backup storage unit input buffer and a volume backup storage unit. The processor is to: store a first set of input data in the backup storage unit input buffer in the event that the primary storage unit input buffer is unable to store the first set of input data and transfer the first set of input data to the primary storage unit input buffer as space is available after storing data from the primary storage unit input buffer in the volume storage unit.

18 Claims, 20 Drawing Sheets

RESOLVING WRITE PRESSURE USING EXISTING BACKUP APPLIANCE AS ADDITIONAL PRIMARY STORAGE

BACKGROUND OF THE INVENTION

For a typical storage system, platforms are used for their inherent capabilities and are treated as separate silos. For example, a primary storage system is used for current working storage and a backup storage system is used for backing up the primary storage system. However, this can lead to higher costs as each silo'ed system must have all of its own resources.

BRIEF DESCRIPTION OF THE DRAWINGS

Various embodiments of the invention are disclosed in the following detailed description and the accompanying drawings.

DETAILED DESCRIPTION

Figure 1:
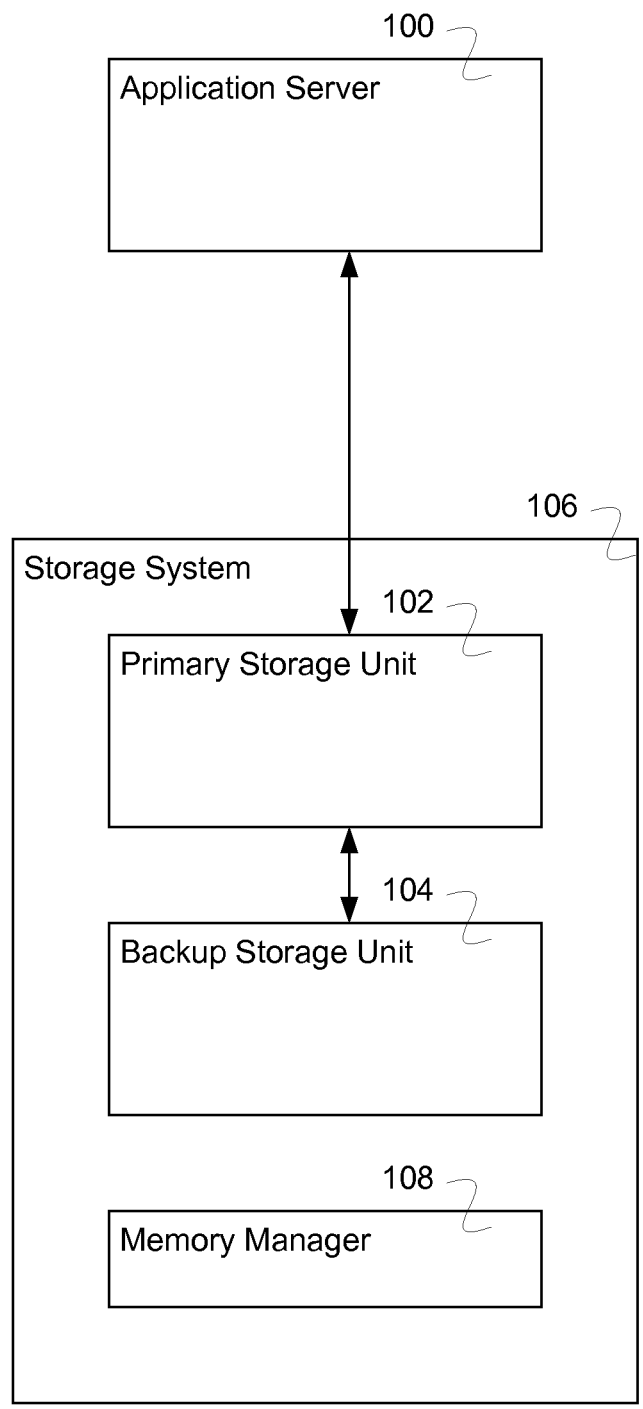
FIG. 1 is a diagram illustrating an embodiment of a system for resolving write pressure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for resolving write pressure is disclosed. The system comprises a primary storage unit, a backup storage unit, and a processor. The primary storage unit comprises a primary storage unit input buffer and a volume storage unit. The backup storage unit comprises a backup storage unit input buffer and a volume backup storage unit. The processor is to store a first set of input data in the backup storage unit input buffer in the event that the primary storage unit input buffer is unable to store the first set of input data. The processor is to transfer the first set of input data to the primary storage unit input buffer as space is available after storing data from the primary storage unit input buffer in the volume storage unit.

In some embodiments, a storage system uses storage tiering to improve its price/performance ratio by including a smaller high performance memory to immediately service write requests and a larger lower performance memory to permanently store the data of the write requests. In the case of a receiving a large number of write commands in a short period of time, it is possible to fill the smaller high performance memory without the high performance memory being able to off load data to the larger lower performance memory. Once the smaller high performance memory is full, the write requests must be stopped so the storage system requests that the write requests stop. This request to stop sending write requests impacts the storage system's ability to perform and/or meet service level objectives.

In some embodiments, the storage system, on indication of the smaller high performance memory being full, redirects the write request to an alternate high performance memory (e.g., a backup storage unit input buffer) associated with a backup system (e.g., a deduplication storage unit). The backup system is designed to back up the storage system that includes the smaller high performance memory (e.g., primary storage unit input buffer) and the large lower performance memory (e.g., a volume storage unit). The redirected writes are temporarily stored in the alternate high performance memory and when space is available in the smaller high performance memory, the redirected writes are transferred back to the smaller high performance memory.

In some embodiments, a memory manager tracks incoming write requests. For example, the memory manager stores a record indicating the incoming data blocks, the order that the data blocks arrive, the files associated with the data blocks, the input buffer location where they are stored, the input buffer location where they are temporarily stored (if appropriate), the location in volume memory where they are stored, and provides an index (e.g., volume memory index) the locations of where data and/or files are stored. The memory manager checks or tracks the available memory in input buffers and in the volume storage. In some embodiments, the memory manager acknowledges receipt of an incoming data and indicates whether the data was stored or not stored.

FIG. 1 is a diagram illustrating an embodiment of a system for resolving write pressure. In the example shown, application server 100 runs an application that requests access to storage system 106. The application server 100 runs application(s) that perform tasks or provide services (e.g., to one or more users). Access to storage system 106 can be for storing data in storage system 106 and/or retrieving data from storage system 106. Storage system 106 comprises primary storage unit 102, backup storage unit 104, and memory manager 108. Primary storage unit 102 provides storage of data and recall of data. In various embodiments, data is stored and recalled using solid state memory, magnetic memory (e.g., hard drive), or any other appropriate memory. Backup storage unit 104 stores backup copies of data stored in primary storage unit 102. In some embodiments, stored backup copies on backup storage unit 104 include data that enables reconstruction of what was stored on primary storage unit 102 at different times in the past. In some embodiments, backup storage unit 104 comprises a data deduplication storage system that breaks data into segments (e.g., based on hash identified anchor locations) and only stores new unique segments in the course of storing the data by referring to copies of old already stored segments to avoid storing duplicate data. Memory manager 108 tracks incoming requests. For example, for write requests, memory manager 108 determines write input buffer location and acknowledges storage to requestor (e.g., application server 108) of input write data. Memory manager 108 manages the transfer of input write data to permanent storage of primary storage unit (e.g., a volume storage in a tiered storage). In some embodiments, in the event that a primary buffer is full, memory manager 108 stores input data in a backup buffer, transfers the data back to the primary buffer prior to storing the data in the volume storage of primary storage unit 102. Storage system 106 comprises one or more processors and one or more memories (e.g., fast memory, solid state memory, slow memory, magnetic memory, hard drive memory, etc.). In some embodiments, the one or more memories store instructions that are provided to a processor of the one or more processors.

Figure 2:
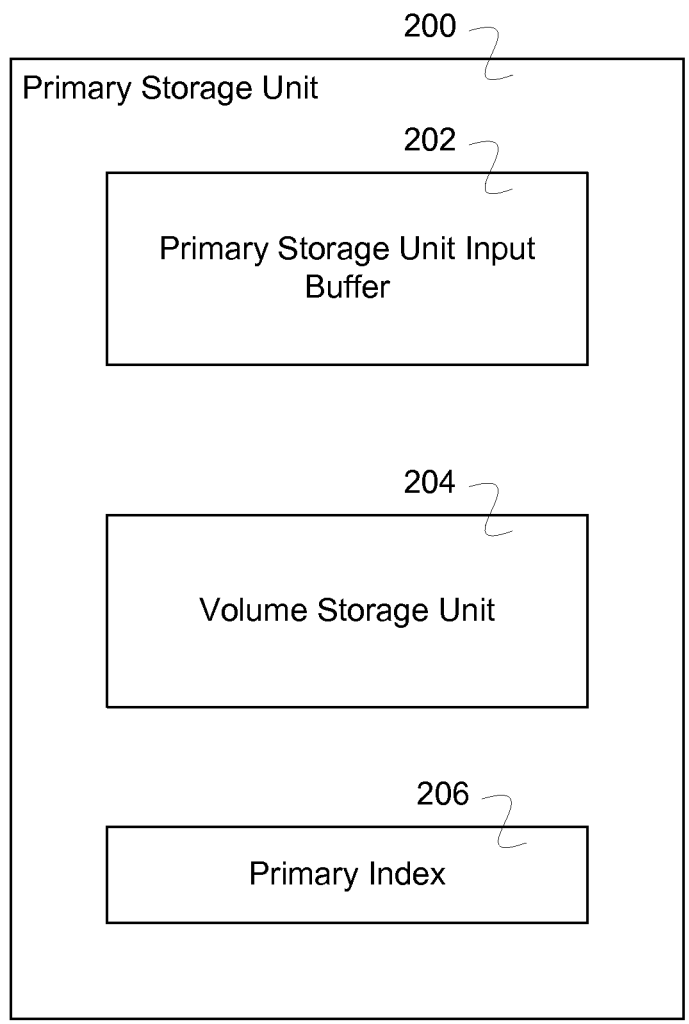
FIG. 2 is a diagram illustrating an embodiment of a primary storage unit.

FIG. 2 is a diagram illustrating an embodiment of a primary storage unit. In some embodiments, primary storage unit 200 is used to implement primary storage unit 102 of FIG. 1. In the example shown, primary storage unit 200 comprises primary storage unit input buffer 202, volume storage unit 204, and primary index 206. Primary storage unit 200 has tiered storage including a faster tier (e.g., primary storage unit input buffer 202) and a slower tier (e.g., volume storage unit 204). The faster tier can, for example, receive write storage requests faster than the slower tier can write the storage requests. In the event that the faster tier fills, primary storage unit 200 indicates to the requestor (e.g., an application server, a user, etc.) that that the requests are not being serviced and to halt requests. After the slower tier has made some space in the faster tier (e.g., by storing data in the faster tier in the slower tier), requests can recommence. Primary index 206 stores information so that data (e.g., a file) can be located within primary storage unit 200. For example, a file name is associated with one or more memory locations in primary storage unit 200 (e.g., an address of a block or memory location in volume storage unit 204). In various embodiments, a fast tier comprises a random access memory, a solid state memory, a flash memory, or any other appropriate memory. In various embodiments, a slow tier comprises a hard drive, a redundant array of independent disks, a fiber channel drive, a serial or parallel advanced technology attachment hard drive, an integrated drive electronics hard drive, a small computer system interface hard drive, or any other appropriate storage device.

Figure 3:
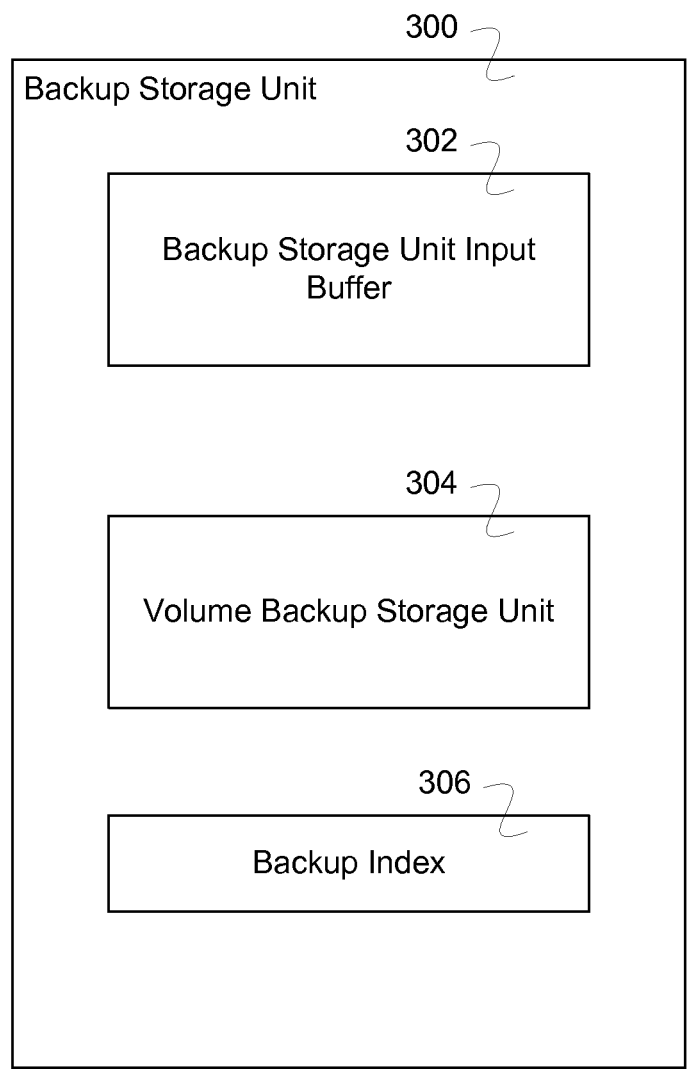
FIG. 3 is a diagram illustrating an embodiment of a backup storage unit.

FIG. 3 is a diagram illustrating an embodiment of a backup storage unit. In some embodiments, backup storage unit 300 is used to implement backup storage unit 104 of FIG. 1. In the example shown, backup storage unit 300 comprises backup storage unit input buffer 302, volume backup storage unit 304, and backup index 306. Backup storage unit 300 has tiered storage including a faster tier (e.g., backup storage unit input buffer 302) and a slower tier (e.g., volume backup storage unit 304). The faster tier can, for example, receive write storage requests faster than the slower tier can write the storage requests. In the event that the faster tier fills, backup storage unit 300 indicates to the requestor (e.g., an application server, a user, etc.) that that the requests are not being serviced and to halt requests. After the slower tier has made some space in the faster tier (e.g., by storing data in the faster tier in the slower tier), requests can recommence. Backup index 306 stores information so that data (e.g., a file) can be located within backup storage unit 300. For example, a file name is associated with one or more memory locations in backup storage unit 300 (e.g., an address of a block or memory location in volume storage unit 304). In various embodiments, a fast tier comprises a random access memory, a solid state memory, a flash memory, or any other appropriate memory. In various embodiments, a slow tier comprises a hard drive, a redundant array of independent disks, a fiber channel drive, a serial or parallel advanced technology attachment hard drive, an integrated drive electronics hard drive, a small computer system interface hard drive, or any other appropriate storage device.

In some embodiments, backup storage unit 300 comprises a deduplication storage unit (e.g., a segment deduplication storage unit). The fast tier stores incoming data during deduplication (e.g., deduplication comprises breaking file/data stream into segments using a hash function; checking whether a segment of the file/data stream is previously stored; in the event that the segment is not previously stored, storing the new segment; in the event that the segment is previously stored, storing a reference to the old segment; storing the file/data stream as a set of pointers to stored segments (newly stored and previously stored)) and during reconstruction (e.g., locating set of stored segments associated with the file/data stream, assembling the segments in order, etc.).

Figure 4A:
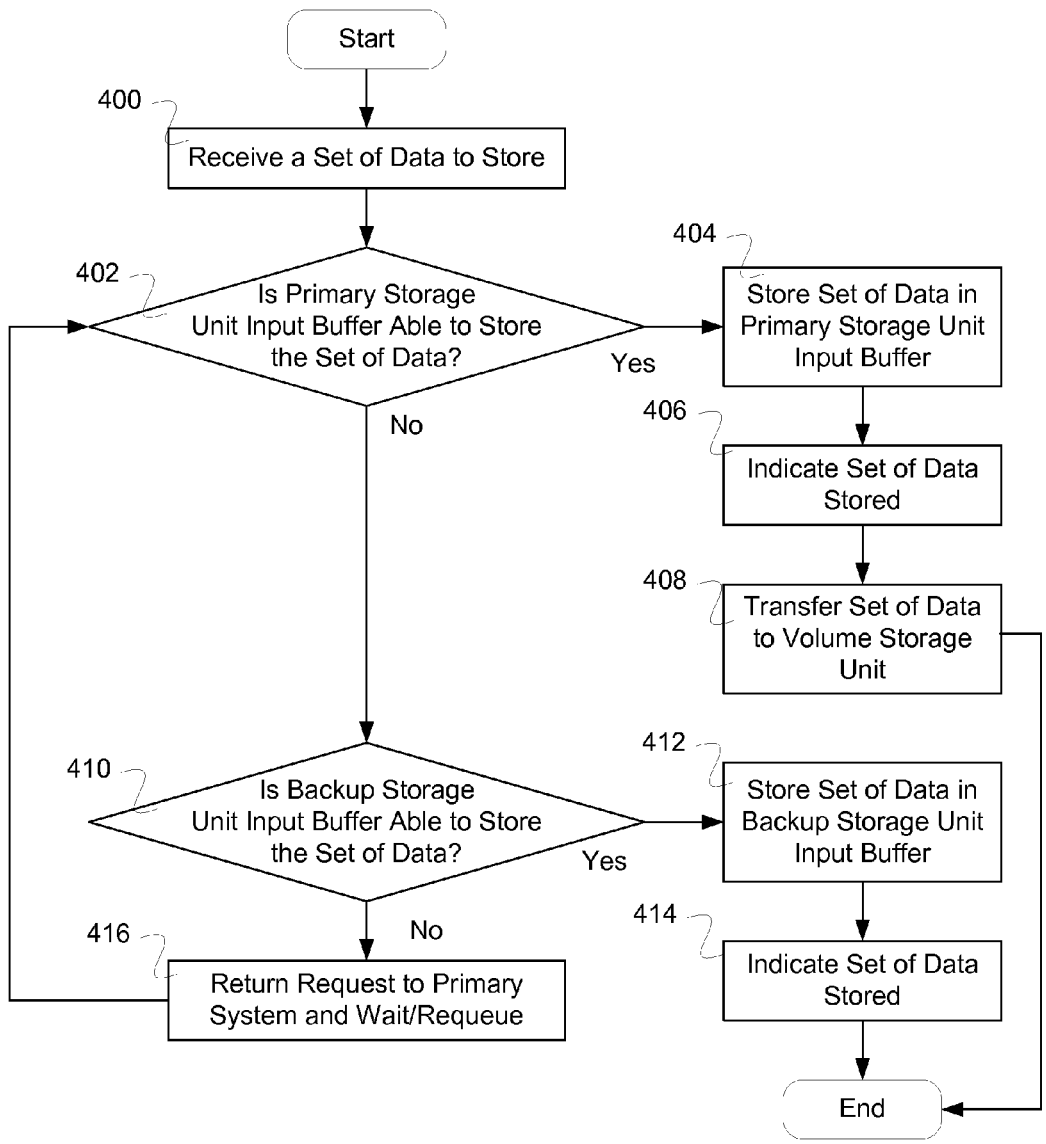
FIG. 4A is a flow diagram illustrating an embodiment of a process for resolving write pressure.

FIG. 4A is a flow diagram illustrating an embodiment of a process for resolving write pressure. In some embodiments, the process of FIG. 4A is implemented by storage system 106 of FIG. 1. In the example shown, in 400 a set of data is received to store. For example, the storage system receives a data stream or a plurality of data blocks is received from an application server, a user using an application server, or directly from a user system. In 402, it is determined whether the primary storage unit input buffer is able to store the set of data. For example, a memory manager determines whether there is available space in the primary storage unit input buffer and whether the received data (all or a portion of the received set of data) is able to be stored. In some embodiments, portions of the set of data are able to be stored and other portions are not and are processed separately. In some embodiments, the memory manager actively polls (e.g., on a periodic basis) the input buffer to determine available space and tracks this space over time.

In the event that the primary storage unit input buffer is able to store the set of data, in 404 the data set is stored in the primary unit input buffer. For example, the received set of data is stored at a location in the input buffer and noted in the index as occupying locations in the input buffer. In 406, the set of data is indicated to be stored. For example, the storage system indicates to the application server that the set of data is stored. In some embodiments, a good status is sent to the application server or host. In 408, the set of data is transferred to volume storage unit, and the process ends. For example, the data stored in the input buffer is copied to the volume storage and once it is confirmed to be stored in the volume storage unit, it is removed from the input buffer and entered into the index as being moved to the volume storage unit (e.g., associated file name and location addresses in the volume storage unit are stored in the index).

In the event that the primary storage unit input buffer is not able to store the set of data, in 410 it is determined whether the backup storage unit input buffer is able to store the set of data. For example, a memory manager determines whether there is available space in the backup storage unit input buffer and whether the received set of data is able to be stored. In the event that the backup storage unit input buffer is able to store the set of data, in 412 the set of data is stored in the backup storage unit input buffer. For example, the received set of data is stored at a location in the input buffer and noted in the index as occupying locations in the input buffer. In 414, the set of data is indicated to be stored. For example, the storage system indicates to the application server that the set of data is stored. In some embodiments, a good status is sent to the application server or host. In the event that the backup storage unit input buffer is not able to store the set of data, in 416 the request is returned to the primary system and the system waits/requeues the request to store the set of data. In some embodiments, the application server decides that it has waited too long and sends a request to remove the request to store the set of data and resubmits the data request.

In some embodiments, the set of data is processed as a set. In some embodiments, the set is broken into smaller units (e.g., a block, smaller set of blocks, etc.) and processed as smaller units. In some embodiments, the set of data is split into two sets of data—one set to be stored in the primary storage unit input buffer and one set to be stored in the backup storage unit input buffer.

Figure 4B:
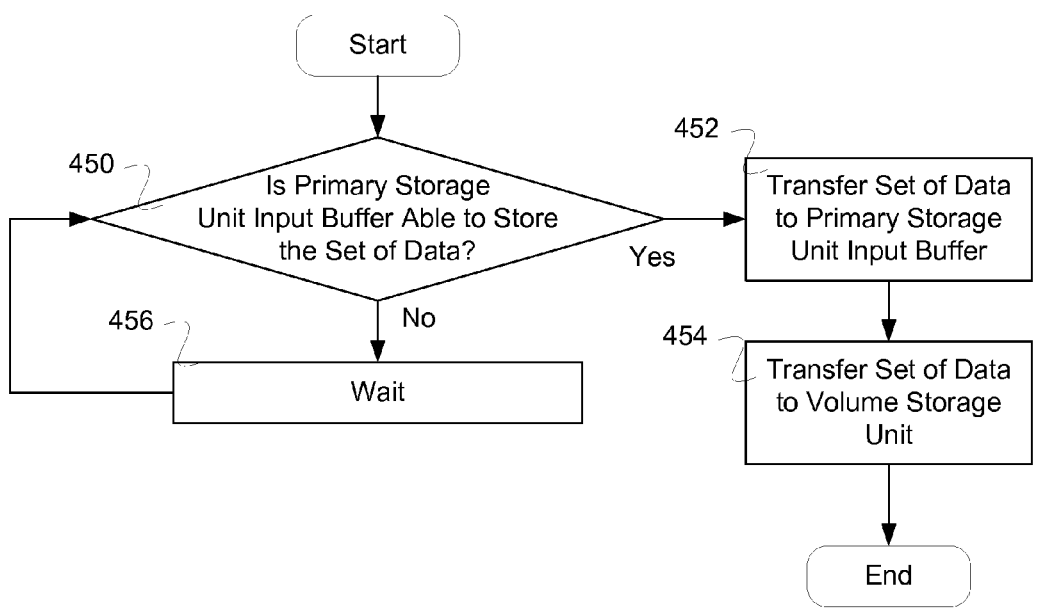
FIG. 4B is a flow diagram illustrating an embodiment of a process for resolving write pressure.

FIG. 4B is a flow diagram illustrating an embodiment of a process for resolving write pressure. In some embodiments, the process of FIG. 4B is implemented by storage system 106 of FIG. 1. In the example shown, the process returns data stored in the backup storage unit input buffer back to the primary storage unit input buffer. In 450, it is determined whether the primary storage unit input buffer is able to store the set of data. In the event that the primary storage unit is not able to store the set of data, in 456 the system waits and control passes to 450. In the event that the primary storage unit is able to store the set of data, in 452 set of data is transferred to primary storage unit input buffer. For example, the set of data is copied from the backup storage unit input buffer to the primary storage unit input buffer, once confirmation of storing in primary storage unit input buffer, remove set of data from backup storage unit input buffer, adjust index to indicate data is stored in primary storage unit input buffer. In 454, set of data is transferred to volume storage unit, and the process ends. For example, the set of data is copied from the primary storage unit input buffer to the volume storage unit, once confirmation of storing in volume storage unit, remove set of data from primary storage unit input buffer, adjust index to indicate data is stored in volume storage unit.

Figure 5:
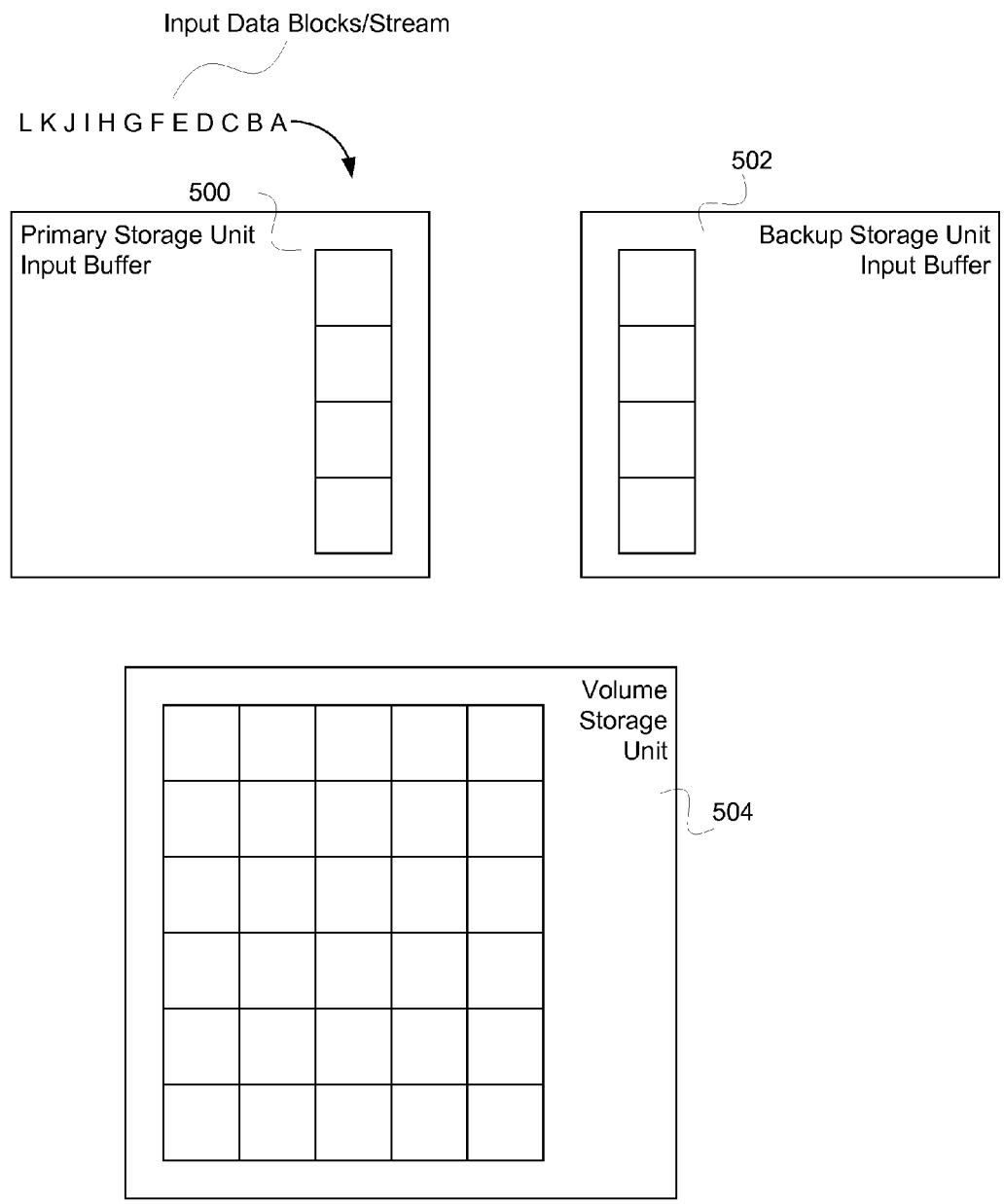
FIG. 5 is a diagram illustrating an embodiment of resolving write pressure.

FIG. 5 is a diagram illustrating an embodiment of resolving write pressure. In some embodiments, the system shown in FIG. 5 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 500 has sufficient space to store received data. The storage system includes backup storage input buffer 502 and volume storage 504. Primary storage input buffer 500, backup storage input buffer 502, and volume storage 504 are shown with representative spaces that are smaller than actual typical sizes of the memories. For example, primary storage input buffer 500 stores 10, 20, 50, or 200 gigabytes, backup storage input buffer 502 stores 10, 20, 50, or 200 gigabytes, and volume storage 504 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers.

Figure 6:
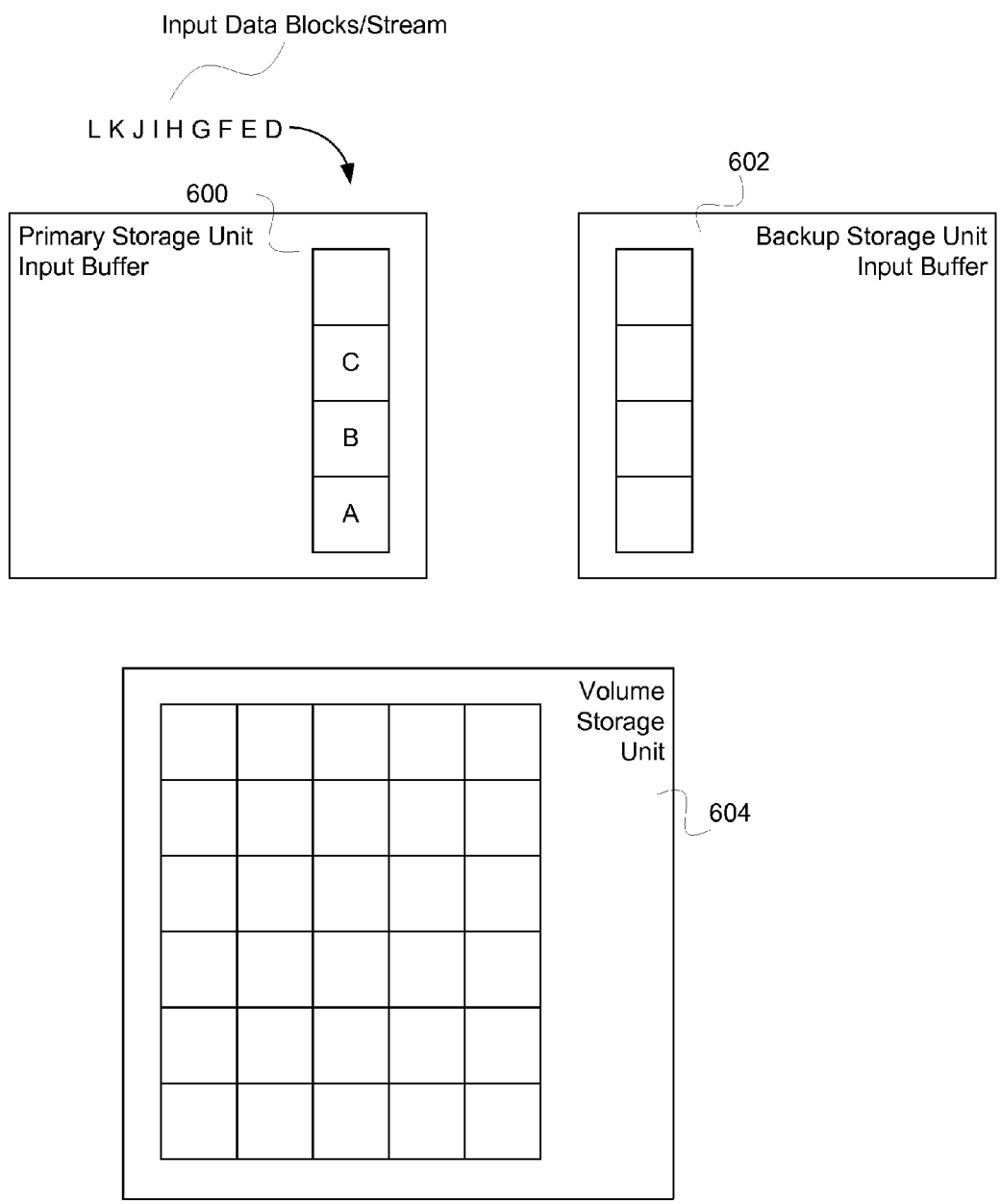
FIG. 6 is a diagram illustrating an embodiment of resolving write pressure.

FIG. 6 is a diagram illustrating an embodiment of resolving write pressure. In some embodiments, the system shown in FIG. 6 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 600 has sufficient space to store received data. The storage system includes backup storage input buffer 602 and volume storage 604. Primary storage input buffer 600, backup storage input buffer 602, and volume storage 604 are shown with representative spaces that are smaller than actual typical sizes of the memories. For example, primary storage input buffer 600 stores 10, 20, 50, or 200 gigabytes, backup storage input buffer 602 stores 10, 20, 50, or 200 gigabytes, and volume storage 604 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers. Data 'A', 'B', and 'C' are stored in primary storage input buffer 600 and memory manager notes locations. Index in primary storage unit notes memory locations used and data in the locations.

Figure 7:
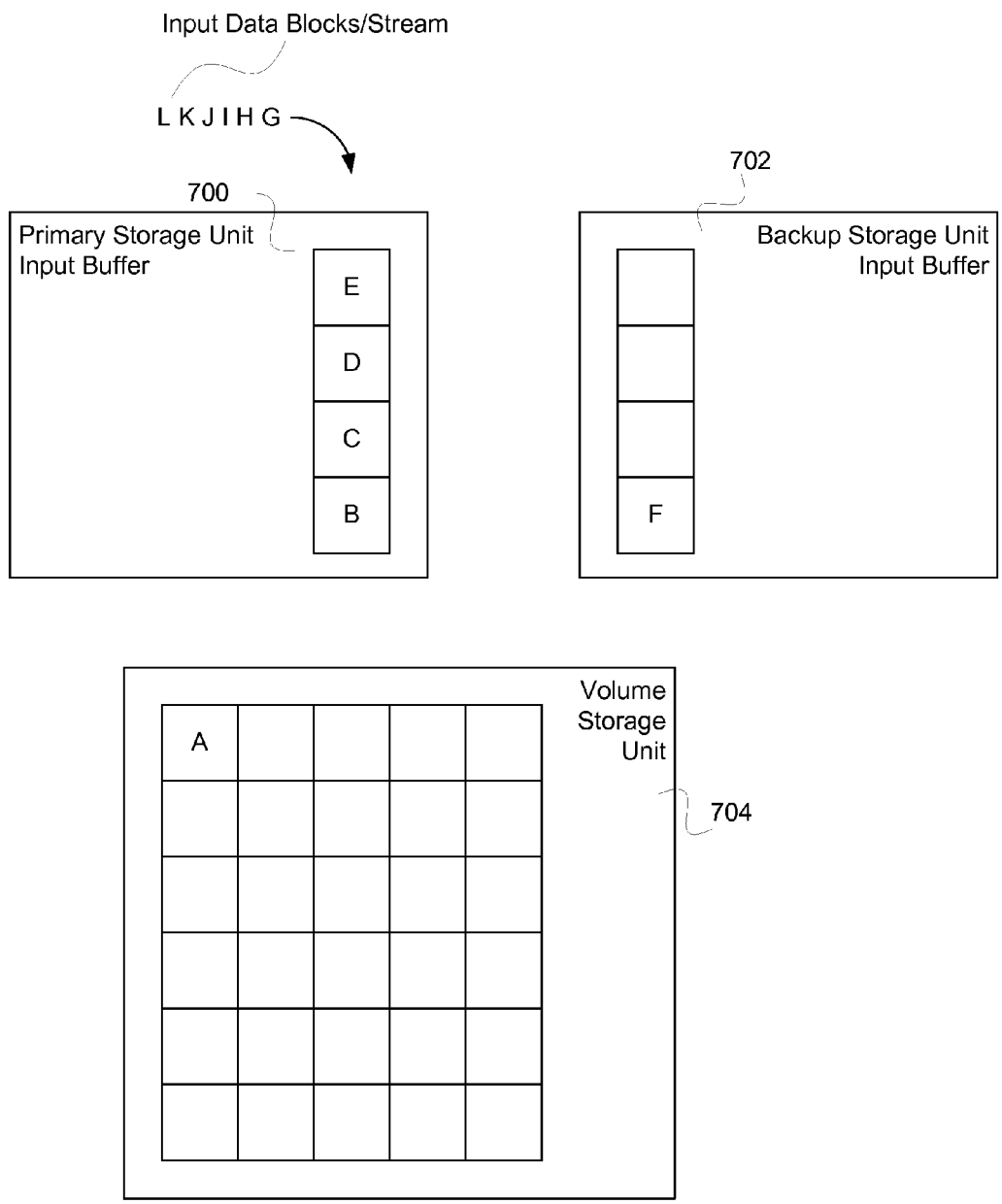
FIG. 7 is a diagram illustrating an embodiment of resolving write pressure.

FIG. 7 is a diagram illustrating an embodiment of resolving write pressure. In some embodiments, the system shown in FIG. 7 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 700 has sufficient space to store received data. The storage system includes backup storage input buffer 702 and volume storage 704. Primary storage input buffer 700, backup storage input buffer 702, and volume storage 704 are shown with representative spaces that are smaller than actual typical sizes of the memories. For example, primary storage input buffer 700 stores 10, 20, 50, or 200 gigabytes, backup storage input buffer 702 stores 10, 20, 50, or 200 gigabytes, and volume storage 704 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers, but memory manager determines some data must go to alternate input buffer. Data 'A' is transferred from primary storage input buffer to volume storage 704. New data 'D' and 'E' is stored in primary storage input buffer 700 along with previously stored 'B' and 'C'. Data 'F' is stored in backup storage input buffer 702. Memory manager notes data locations. Index in primary storage unit notes memory locations used and data in the locations. Index in backup storage unit notes memory locations used and data in the locations.

In some embodiments, the input data set is split and stored in a primary storage unit input buffer and a backup storage unit input buffer.

Figure 8:
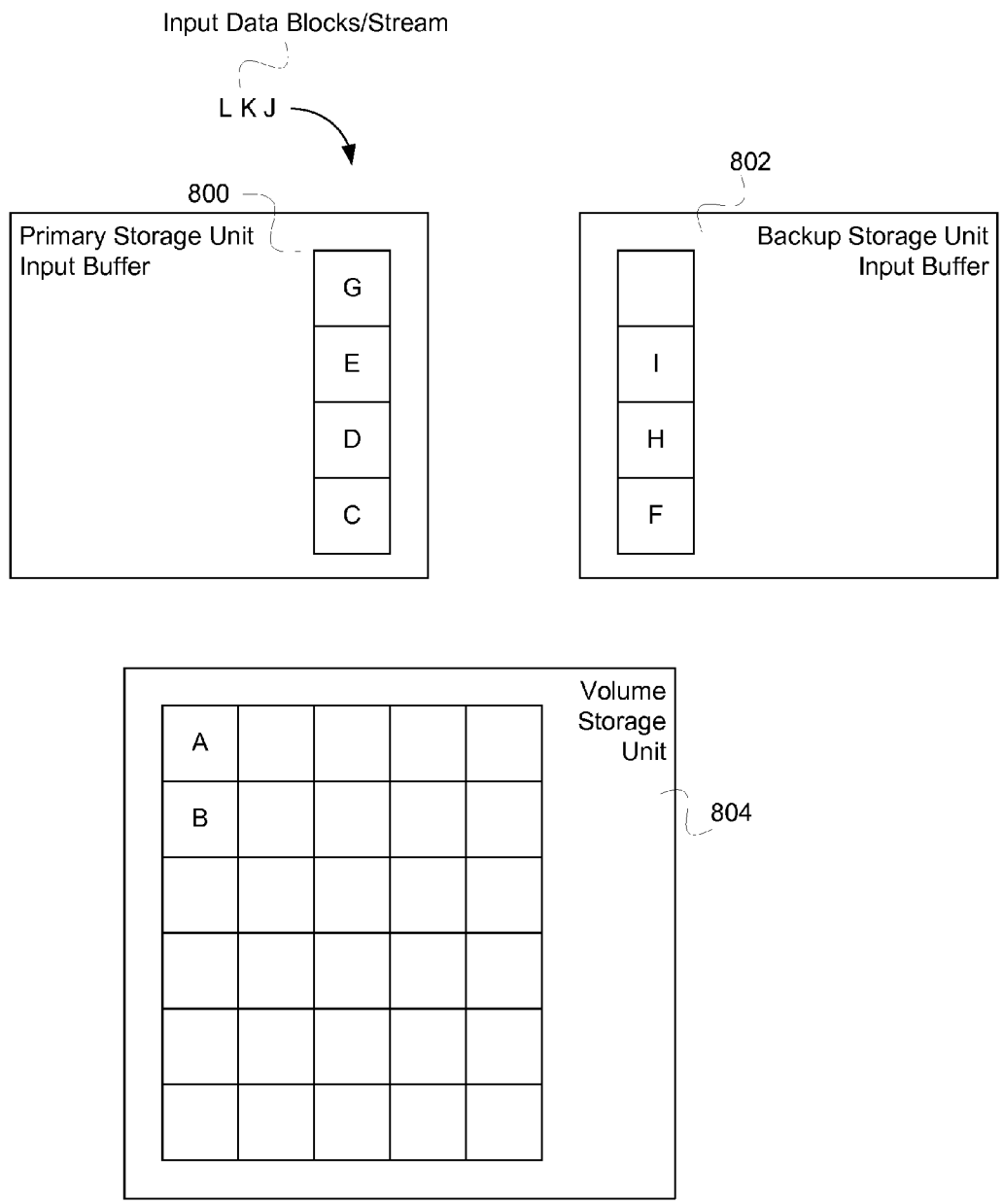
FIG. 8 is a diagram illustrating an embodiment of resolving write pressure.

FIG. 8 is a diagram illustrating an embodiment of resolving write pressure. In some embodiments, the system shown in FIG. 8 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 800 has sufficient space to store received data. The storage system includes backup storage input buffer 802 and volume storage 804. Primary storage input buffer 800, backup storage input buffer 802, and volume storage 804 are shown with representative spaces that are smaller than actual typical sizes of the memories. For example, primary storage input buffer 800 stores 10, 20, 50, or 200 gigabytes, backup storage input buffer 802 stores 10, 20, 50, or 200 gigabytes, and volume storage 804 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers, but memory manager determines some data must go to alternate input buffer. Data 'B' is transferred from primary storage input buffer to volume storage 804 and is stored along with data 'A'. New data 'G' is stored in primary storage input buffer 800 along with previously stored 'C', 'D', and 'E'. Data 'H' and 'I' are stored in backup storage input buffer 802 along with data 'F'. Memory manager notes data locations. Index in primary storage unit notes memory locations used and data in the locations. Index in backup storage unit notes memory locations used and data in the locations.

Figure 9:
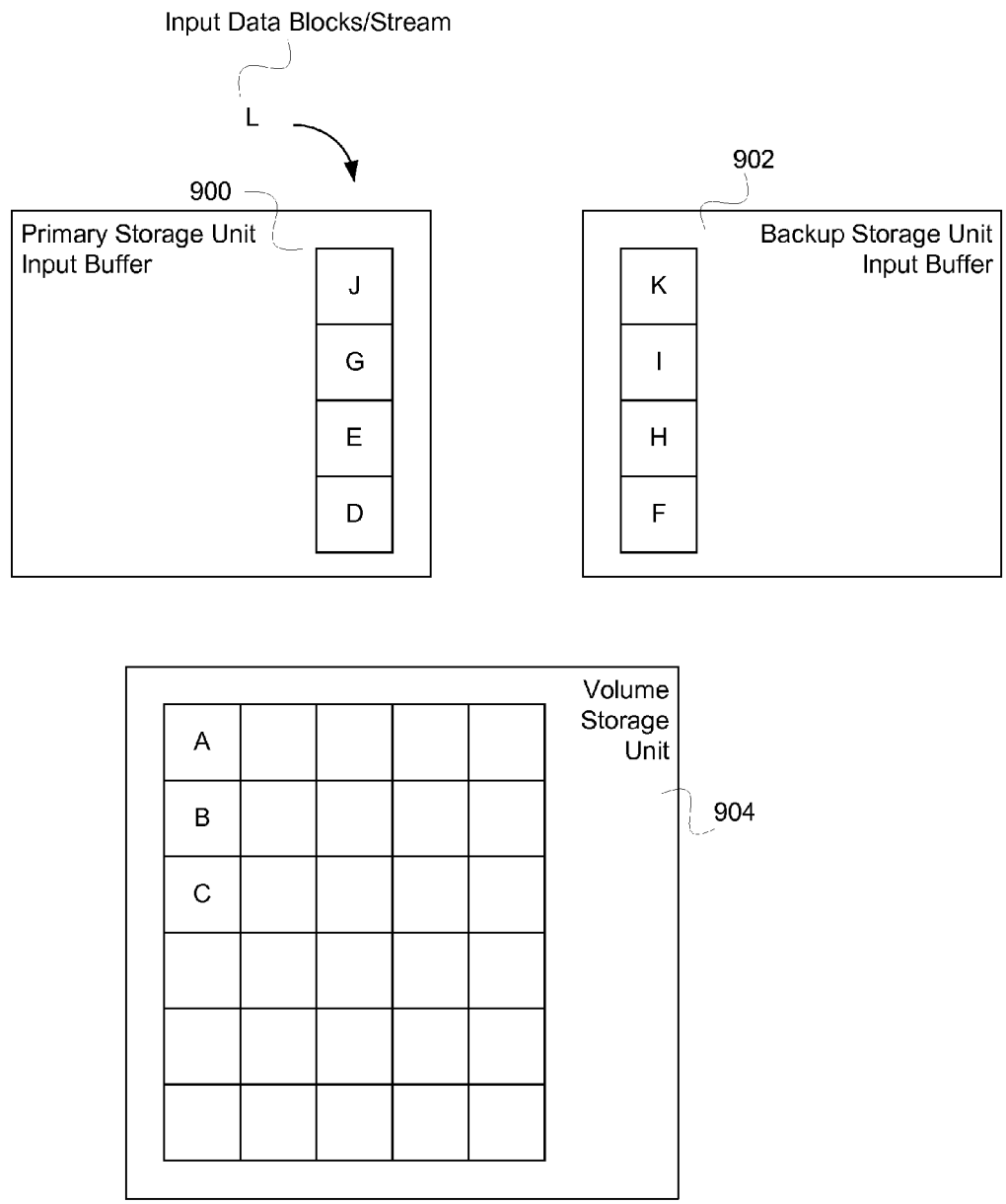
FIG. 9 is a diagram illustrating an embodiment of resolving write pressure.

FIG. 9 is a diagram illustrating an embodiment of resolving write pressure. In some embodiments, the system shown in FIG. 9 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 900 has sufficient space to store received data. The storage system includes backup storage input buffer 902 and volume storage 904. Primary storage input buffer 900, backup storage input buffer 902, and volume storage 904 are shown with representative spaces that are smaller than actual typical sizes of the memories. For example, primary storage input buffer 900 stores 10, 20, 50, or 200 gigabytes, backup storage input buffer 902 stores 10, 20, 50, or 200 gigabytes, and volume storage 904 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers, but memory manager determines some data must go to alternate input buffer. Data 'C' is transferred from primary storage input buffer to volume storage 904 and is stored along with data 'A' and 'B'. New data 'J' is stored in primary storage input buffer 900 along with previously stored 'D', 'E', and 'G'. Data 'K' is stored in backup storage input buffer 902 along with data 'F', 'H', and 'I'. Data storage system needs to indicate that 'L' cannot be stored. Memory manager notes data locations. Index in primary storage unit notes memory locations used and data in the locations. Index in backup storage unit notes memory locations used and data in the locations.

Figure 10:
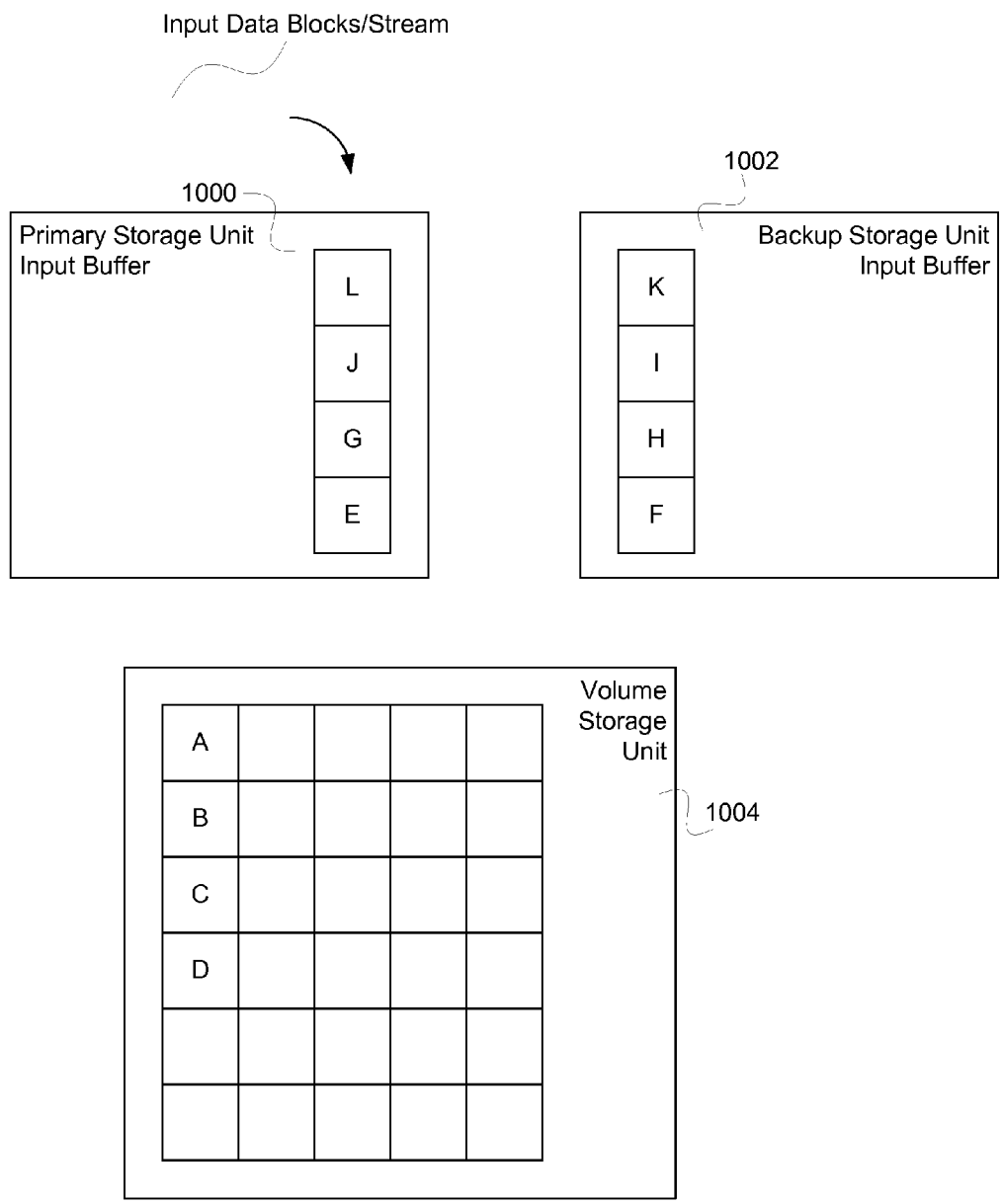
FIG. 10 is a diagram illustrating an embodiment of resolving write pressure.

FIG. 10 is a diagram illustrating an embodiment of resolving write pressure. In some embodiments, the system shown in FIG. 10 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 1000 has sufficient space to store received data. The storage system includes backup storage input buffer 1002 and volume storage 1004. Primary storage input buffer 1000, backup storage input buffer 1002, and volume storage 1004 are shown with representative spaces that are smaller than actual typical sizes of the memories. For example, primary storage input buffer 1000 stores 10, 20, 50, or 200 gigabytes, backup storage input buffer 1002 stores 10, 20, 50, or 200 gigabytes, and volume storage 1004 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in one input buffer. Data 'D' is transferred from primary storage input buffer to volume storage 1004 and is stored along with data 'A', 'B', and 'C'. New data 'L' is stored in primary storage input buffer 1000 along with previously stored 'E', 'G', and 'J'. Data 'K' is stored in backup storage input buffer 902 along with data 'F', 'H', and 'I'. Memory manager notes data locations. Index in primary storage unit notes memory locations used and data in the locations. Index in backup storage unit notes memory locations used and data in the locations.

Figure 11:
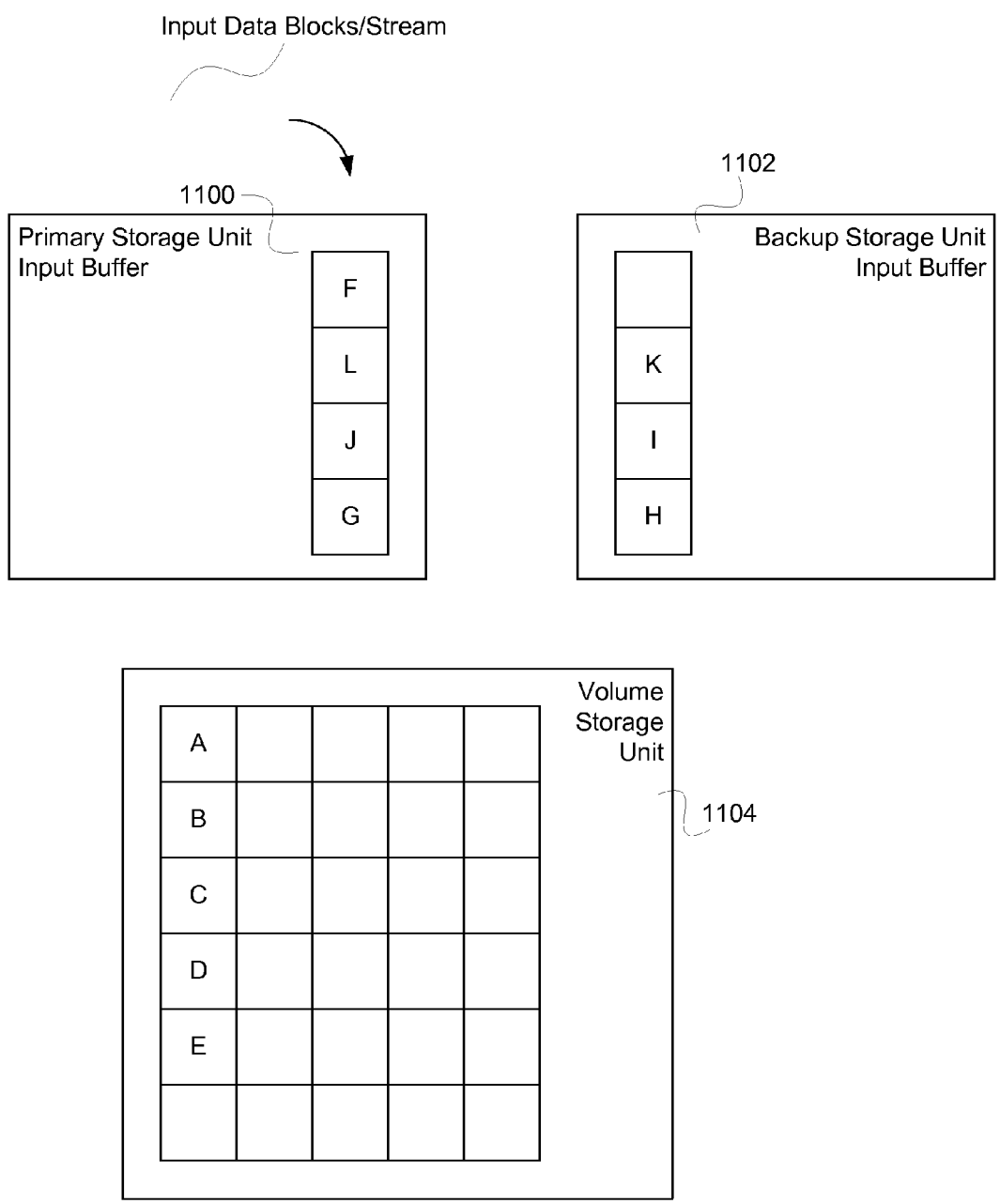
FIG. 11 is a diagram illustrating an embodiment of resolving write pressure.

FIG. 11 is a diagram illustrating an embodiment of resolving write pressure. In some embodiments, the system shown in FIG. 11 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 1100 has sufficient space to store received data. The storage system includes backup storage input buffer 1102 and volume storage 1104. Primary storage input buffer 1100, backup storage input buffer 1102, and volume storage 1104 are shown with representative spaces that are smaller than actual typical sizes of the memories. For example, primary storage input buffer 1100 stores 10, 20, 50, or 200 gigabytes, backup storage input buffer 1102 stores 10, 20, 50, or 200 gigabytes, and volume storage 1104 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers. Data 'E' is transferred from primary storage input buffer to volume storage 1104 and is stored along with data 'A', 'B', 'C', and 'D'. Data 'F' is transferred to primary storage input buffer 1100 along with previously stored 'G', 'J', and 'L'. Data 'K', 'H', and 'I' are stored in backup storage input buffer 902. Memory manager notes data locations. Index in primary storage unit notes memory locations used and data in the locations. Index in backup storage unit notes memory locations used and data in the locations.

Figure 12:
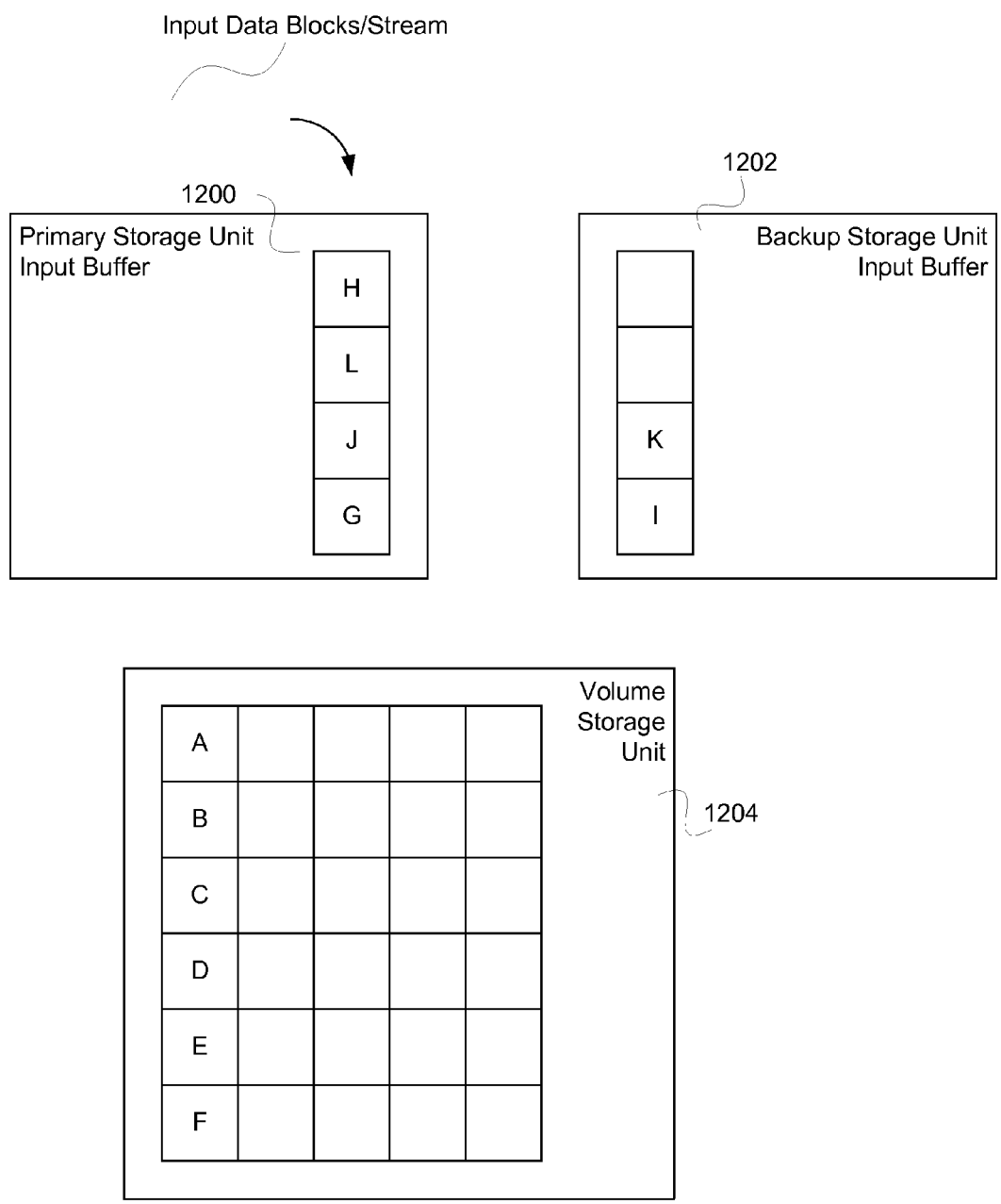
FIG. 12 is a diagram illustrating an embodiment of resolving write pressure.

FIG. 12 is a diagram illustrating an embodiment of resolving write pressure. In some embodiments, the system shown in FIG. 12 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 1200 has sufficient space to store received data. The storage system includes backup storage input buffer 1202 and volume storage 1204. Primary storage input buffer 1200, backup storage input buffer 1202, and volume storage 1204 are shown with representative spaces that are smaller than actual typical sizes of the memories. For example, primary storage input buffer 1200 stores 10, 20, 50, or 200 gigabytes, backup storage input buffer 1202 stores 10, 20, 50, or 200 gigabytes, and volume storage 1204 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers. Data 'F' is transferred from primary storage input buffer to volume storage 1204 and is stored along with data 'A', 'B', 'C', 'D', and 'E'. Data 'H' is transferred to primary storage input buffer 1200 along with previously stored 'G', 'J', and 'L'. Data 'K' and 'I' are stored in backup storage input buffer 1202. Memory manager notes data locations. Index in primary storage unit notes memory locations used and data in the locations. Index in backup storage unit notes memory locations used and data in the locations.

In some embodiments, a memory manager tracks the order data arrives and ensures that transfer into volume storage unit is the same as arrival order regardless of order in primary storage unit input buffer.

Figure 13:
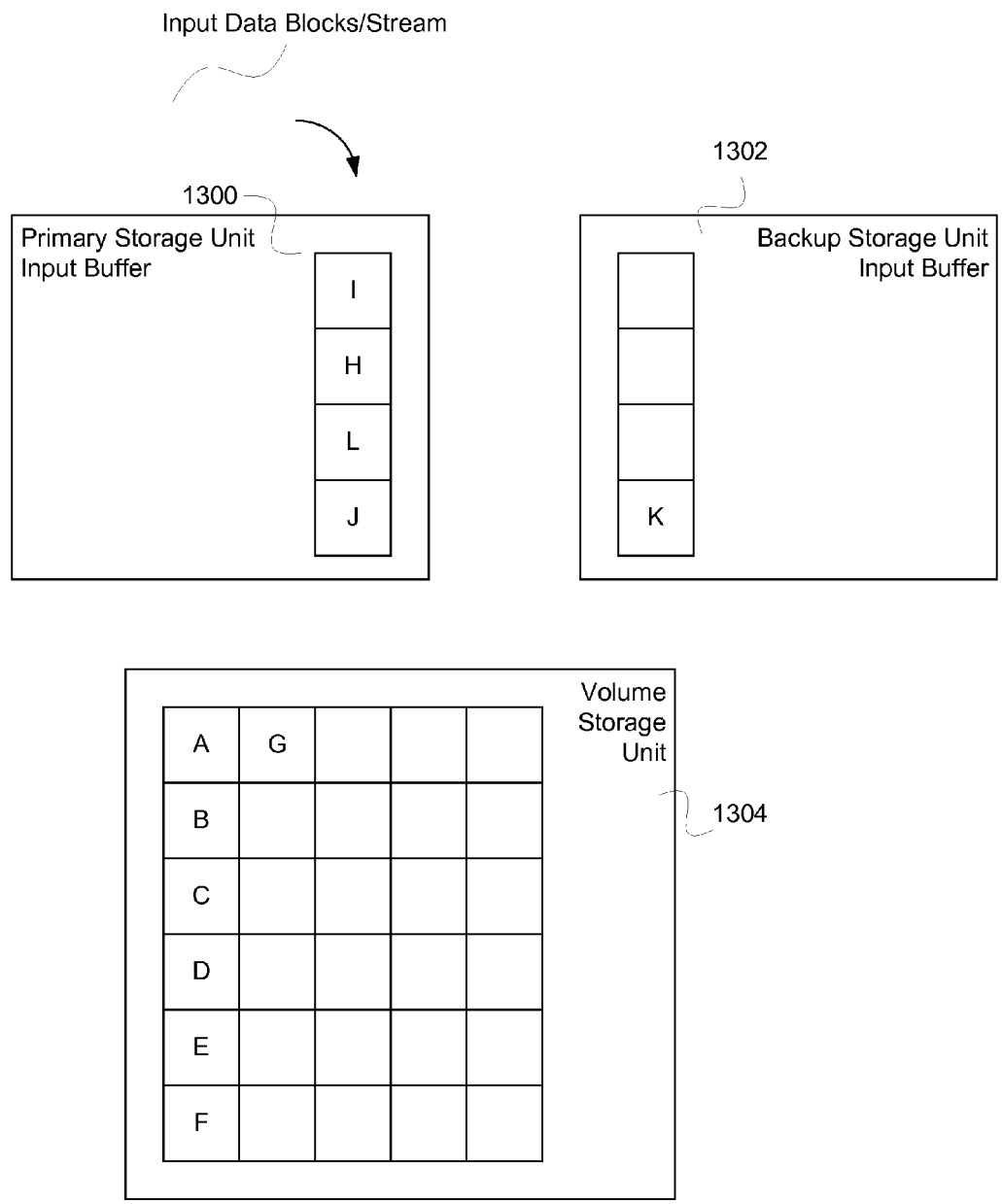
FIG. 13 is a diagram illustrating an embodiment of resolving write pressure.

FIG. 13 is a diagram illustrating an embodiment of resolving write pressure. In some embodiments, the system shown in FIG. 13 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 1300 has sufficient space to store received data. The storage system includes backup storage input buffer 1302 and volume storage 1304. Primary storage input buffer 1300, backup storage input buffer 1302, and volume storage 1304 are shown with representative spaces that are smaller than actual typical sizes of the memories. For example, primary storage input buffer 1300 stores 10, 20, 50, or 200 gigabytes, backup storage input buffer 1302 stores 10, 20, 50, or 200 gigabytes, and volume storage 1304 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers. Data 'G' is transferred from primary storage input buffer to volume storage 1304 and is stored along with data 'A', 'B', 'C', 'D', 'E', and 'F'. Data 'I' is transferred to primary storage input buffer 1300 along with previously stored 'H', 'J', and 'L'. Data 'K' is stored in backup storage input buffer 1302. Memory manager notes data locations. Index in primary storage unit notes memory locations used and data in the locations. Index in backup storage unit notes memory locations used and data in the locations.

Figure 14:
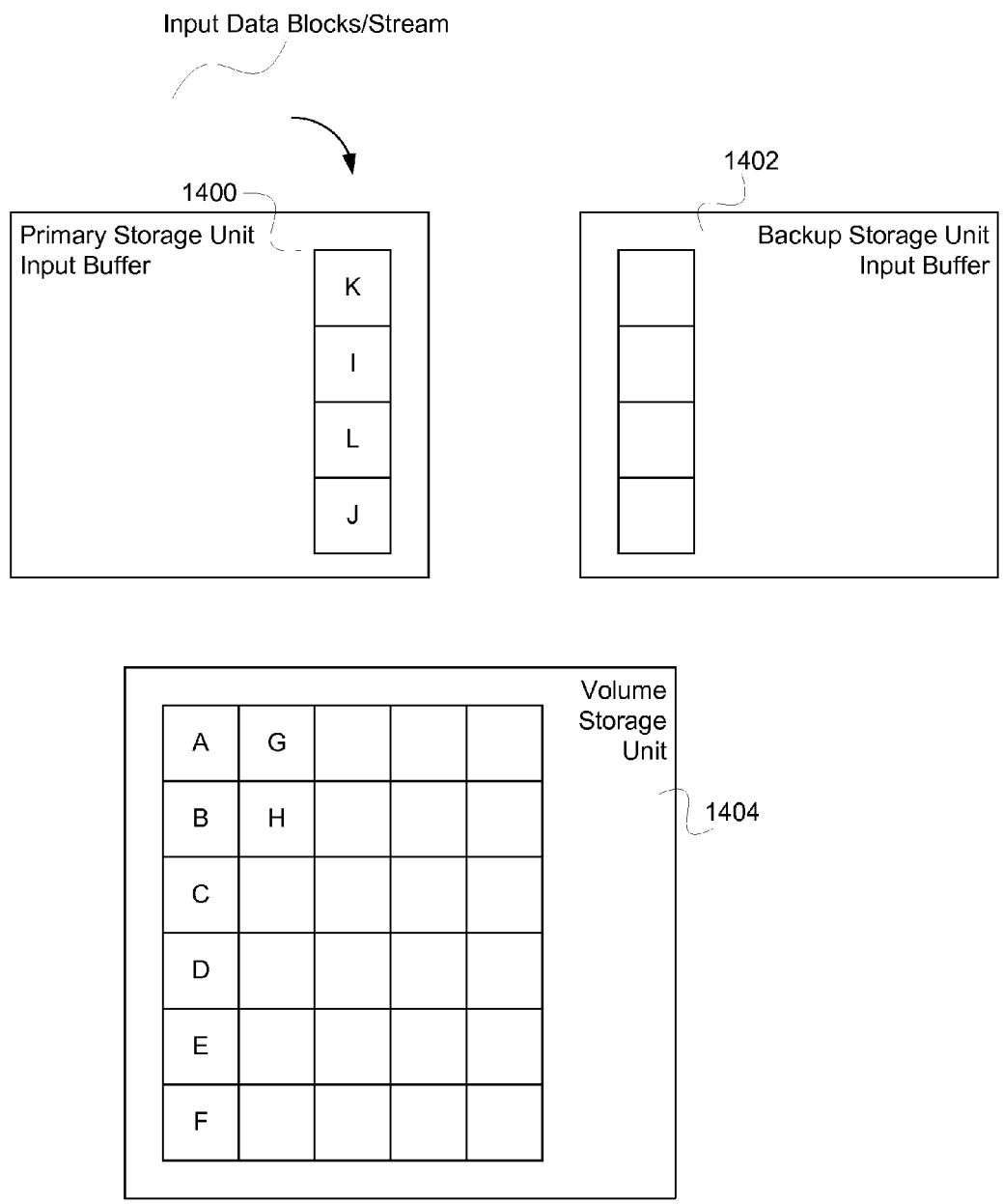
FIG. 14 is a diagram illustrating an embodiment of resolving write pressure.

FIG. 14 is a diagram illustrating an embodiment of resolving write pressure. In some embodiments, the system shown in FIG. 14 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 1400 has sufficient space to store received data. The storage system includes backup storage input buffer 1402 and volume storage 1404. Primary storage input buffer 1400, backup storage input buffer 1402, and volume storage 1404 are shown with representative spaces that are smaller than actual typical sizes of the memories. For example, primary storage input buffer 1400 stores 10, 20, 50, or 200 gigabytes, backup storage input buffer 1402 stores 10, 20, 50, or 200 gigabytes, and volume storage 1404 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers. Data 'H' is transferred from primary storage input buffer to volume storage 1404 and is stored along with data 'A', 'B', 'C', 'D', 'E', 'F' and 'G'. Data 'K' is transferred to primary storage input buffer 1400 along with previously stored 'I', 'J', and 'L'. No data is stored in backup storage input buffer 1402. Memory manager notes data locations. Index in primary storage unit notes memory locations used and data in the locations. Index in backup storage unit notes memory locations used and data in the locations.

Figure 15:
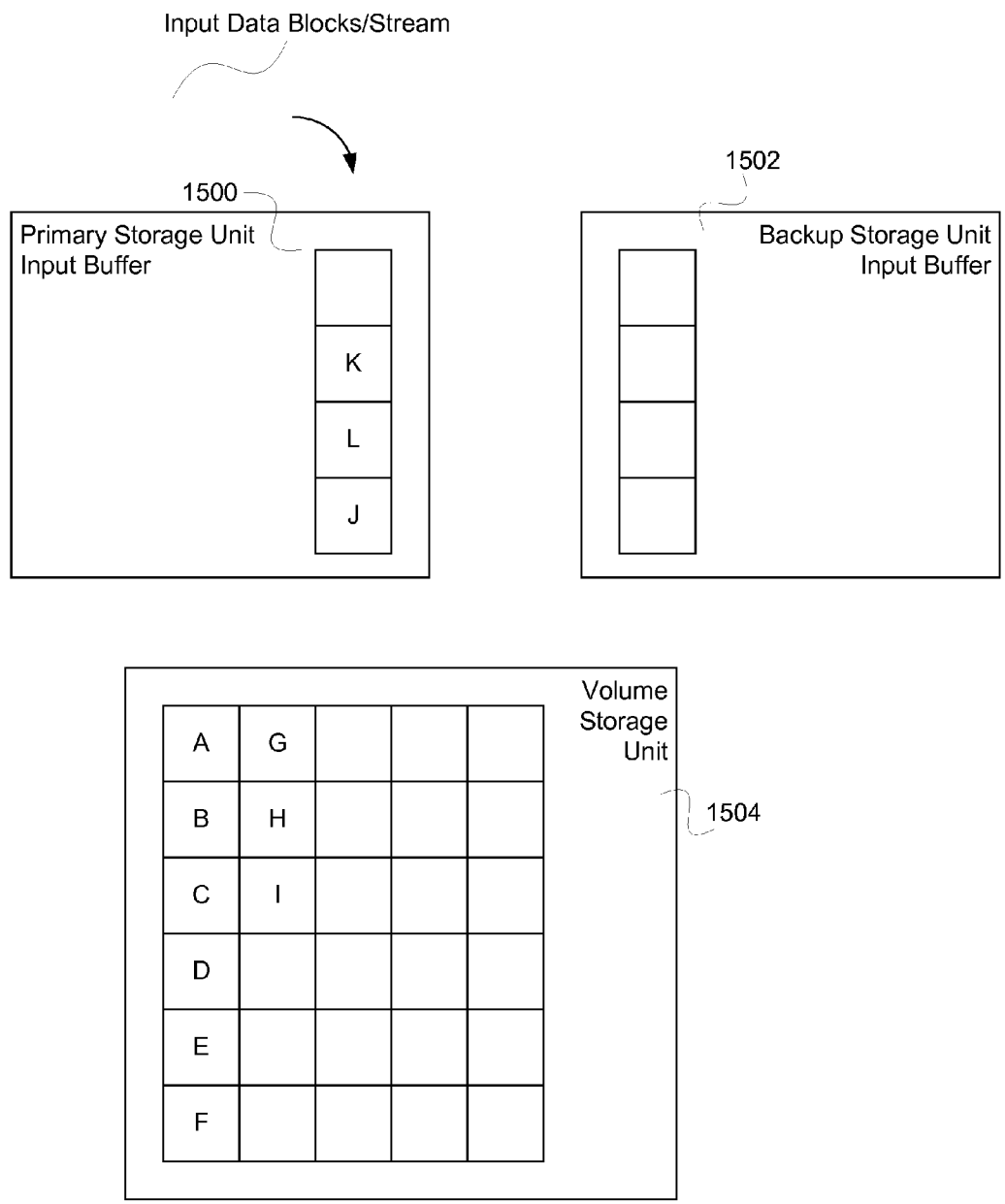
FIG. 15 is a diagram illustrating an embodiment of resolving write pressure.

FIG. 15 is a diagram illustrating an embodiment of resolving write pressure. In some embodiments, the system shown in FIG. 15 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 1500 has sufficient space to store received data. The storage system includes backup storage input buffer 1502 and volume storage 1504. Primary storage input buffer 1500, backup storage input buffer 1502, and volume storage 1504 are shown with representative spaces that are smaller than actual typical sizes of the memories. For example, primary storage input buffer 1500 stores 10, 20, 50, or 200 gigabytes, backup storage input buffer 1502 stores 10, 20, 50, or 200 gigabytes, and volume storage 1504 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers. Data 'I' is transferred from primary storage input buffer to volume storage 1504 and is stored along with data 'A', 'B', 'C', 'D', 'E', 'F', 'G', and 'H'. Data 'K' is still stored in primary storage input buffer 1500 along with previously stored 'J' and 'L'. No data is stored in backup storage input buffer 1502. Memory manager notes data locations. Index in primary storage unit notes memory locations used and data in the locations. Index in backup storage unit notes memory locations used and data in the locations.

Figure 16:
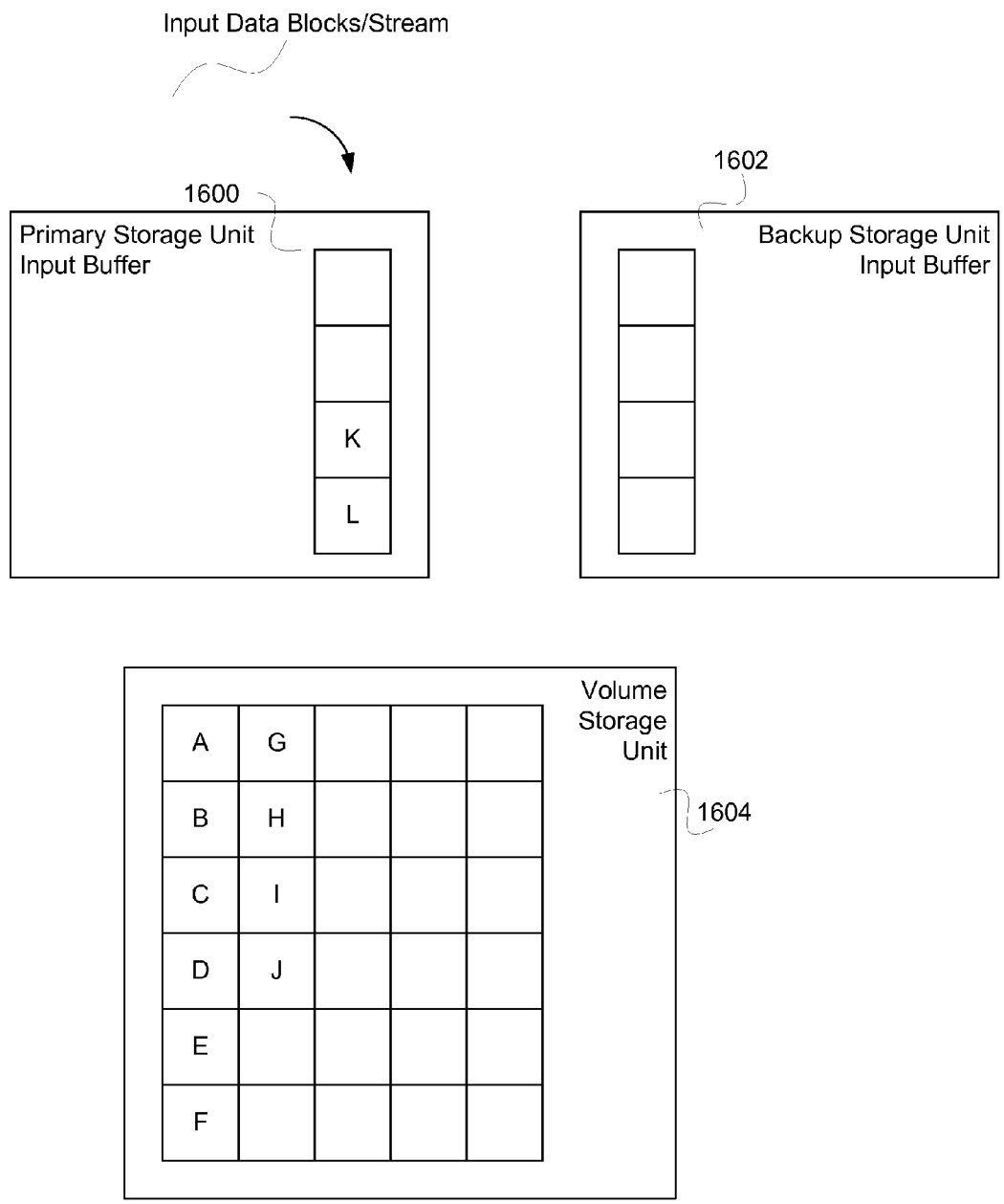
FIG. 16 is a diagram illustrating an embodiment of resolving write pressure.

FIG. 16 is a diagram illustrating an embodiment of resolving write pressure. In some embodiments, the system shown in FIG. 16 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 1600 has sufficient space to store received data. The storage system includes backup storage input buffer 1602 and volume storage 1604. Primary storage input buffer 1600, backup storage input buffer 1602, and volume storage 1604 are shown with representative spaces that are smaller than actual typical sizes of the memories. For example, primary storage input buffer 1600 stores 10, 20, 50, or 200 gigabytes, backup storage input buffer 1602 stores 10, 20, 50, or 200 gigabytes, and volume storage 1604 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers. Data 'J' is transferred from primary storage input buffer to volume storage 1604 and is stored along with data 'A', 'B', 'C', 'D', 'E', 'F', 'G', 'H', and 'I'. Data 'K' is still stored in primary storage input buffer 1600 along with previously stored 'L'. No data is stored in backup storage input buffer 1602. Memory manager notes data locations. Index in primary storage unit notes memory locations used and data in the locations. Index in backup storage unit notes memory locations used and data in the locations.

Figure 17:
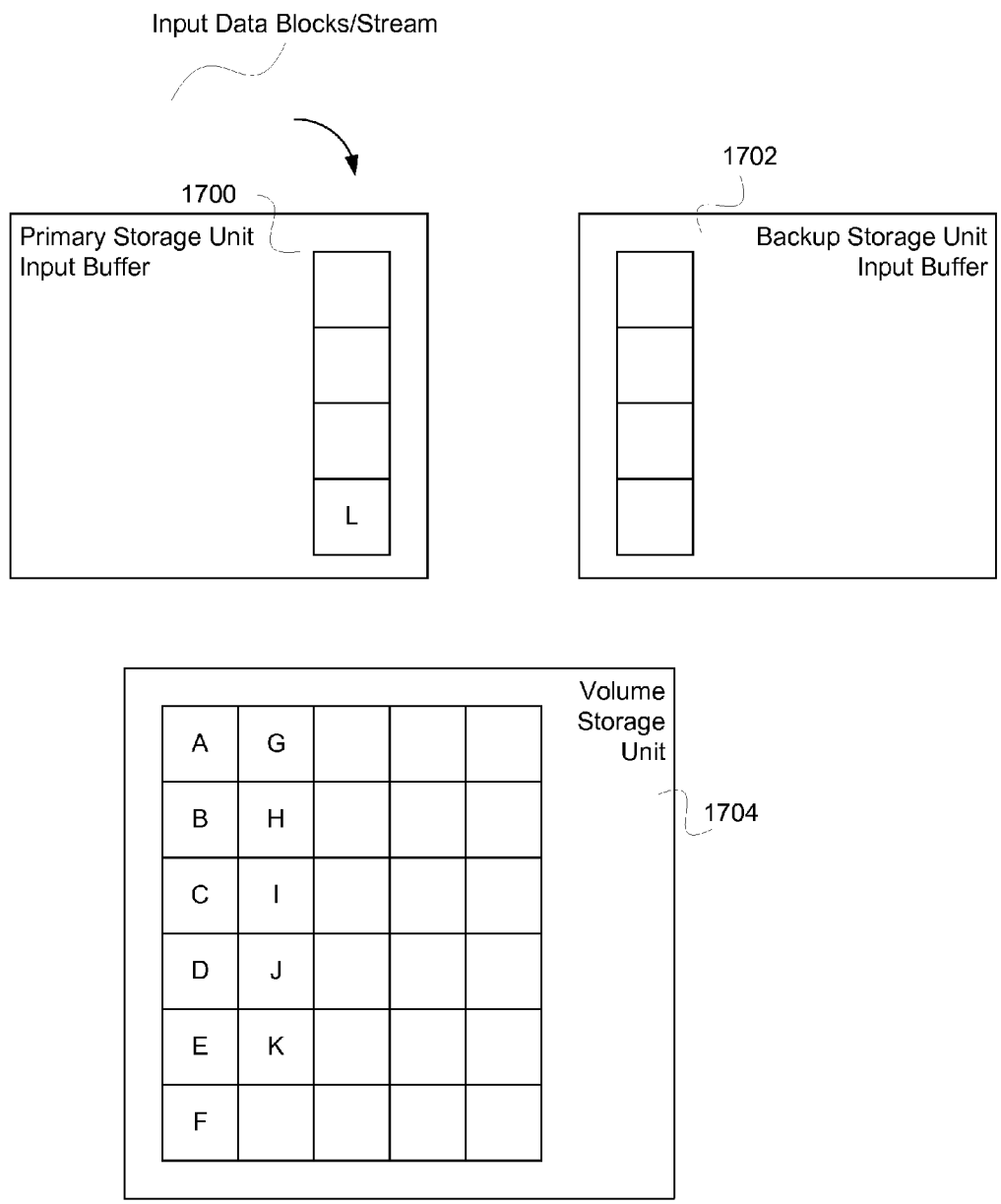
FIG. 17 is a diagram illustrating an embodiment of resolving write pressure.

FIG. 17 is a diagram illustrating an embodiment of resolving write pressure. In some embodiments, the system shown in FIG. 17 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 1700 has sufficient space to store received data. The storage system includes backup storage input buffer 1702 and volume storage 1704. Primary storage input buffer 1700, backup storage input buffer 1702, and volume storage 1704 are shown with representative spaces that are smaller than actual typical sizes of the memories. For example, primary storage input buffer 1700 stores 10, 20, 50, or 200 gigabytes, backup storage input buffer 1702 stores 10, 20, 50, or 200 gigabytes, and volume storage 1704 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers. Data 'K' is transferred from primary storage input buffer to volume storage 1704 and is stored along with data 'A', 'B', 'C', 'D', 'E', 'F', 'G', 'H', 'I', and 'J'. Data 'L' is still stored in primary storage input buffer 1700. No data is stored in backup storage input buffer 1702. Memory manager notes data locations. Index in primary storage unit notes memory locations used and data in the locations. Index in backup storage unit notes memory locations used and data in the locations.

Figure 18:
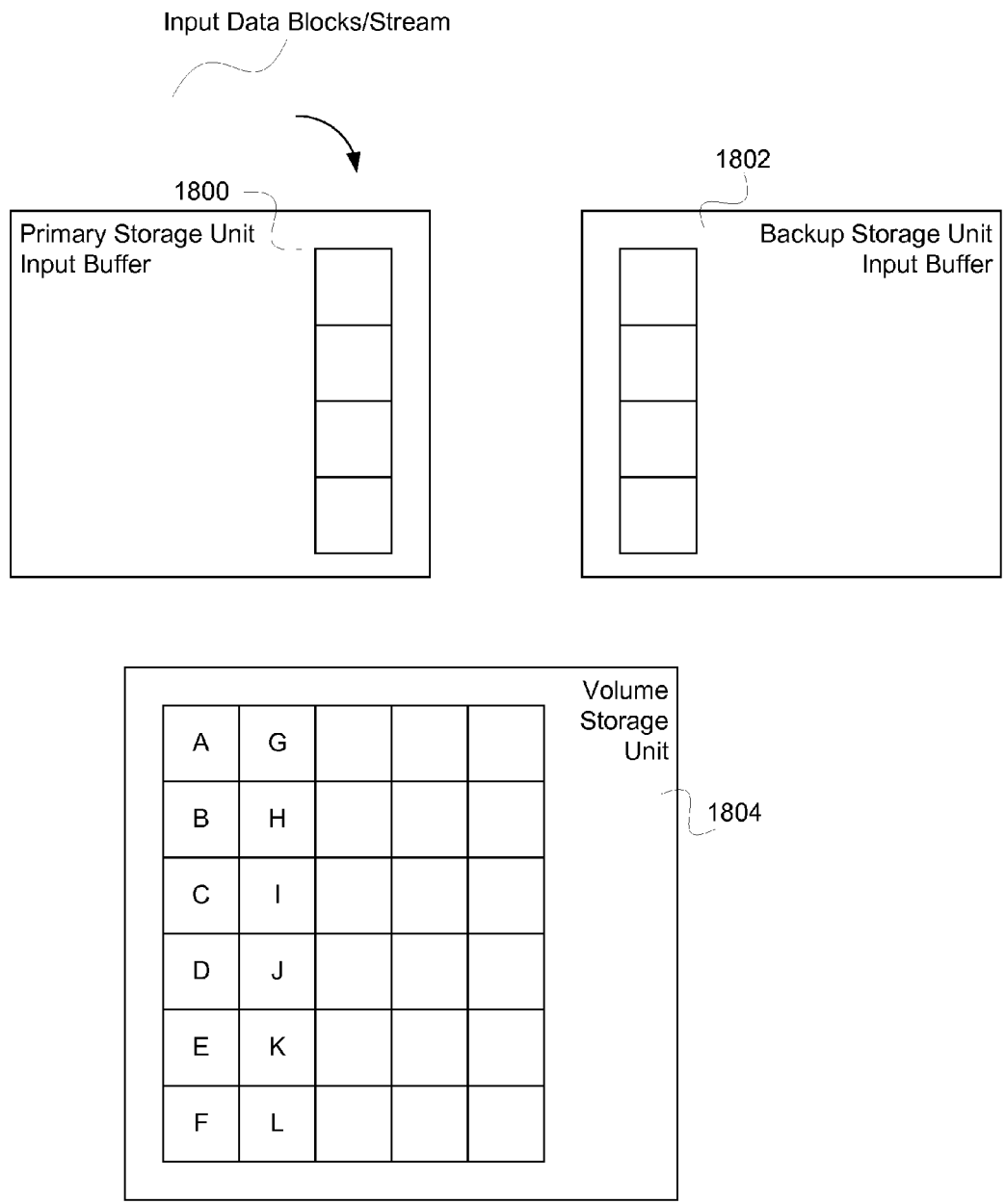
FIG. 18 is a diagram illustrating an embodiment of resolving write pressure.

FIG. 18 is a diagram illustrating an embodiment of resolving write pressure. In some embodiments, the system shown in FIG. 18 represents primary storage unit 200 of FIG. 2 and the backup storage unit 300 of FIG. 3. In the example shown, data (e.g., represented by symbols 'A'. 'B', 'C', 'D', 'E', 'F', 'G', 'H', 'I', 'J', 'K', 'L') is streamed to be received. The storage system determines whether primary storage input buffer 1800 has sufficient space to store received data. The storage system includes backup storage input buffer 1802 and volume storage 1804. Primary storage input buffer 1800, backup storage input buffer 1802, and volume storage 1804 are shown with representative spaces that are smaller than actual typical sizes of the memories. For example, primary storage input buffer 1800 stores 10, 20, 50, or 200 gigabytes, backup storage input buffer 1802 stores 10, 20, 50, or 200 gigabytes, and volume storage 1804 stores 10, 20, 50, or 200 terabytes. In the example shown, the input buffer is able to store 3 data blocks (e.g., each represented by symbol) per time period and the volume data store is able to store 1 data block per time period (actual typical values would be larger). The different rates of transfer for the primary storage unit input buffer and the volume storage unit mean that the input buffer can fill faster than it can transfer to the volume storage unit; in the event that the amount of data coming in to the input buffer exceeds the input buffer size and its ability to shed data to permanent storage (e.g., the volume storage unit), then requests for writing will not be handled unless shunted to an alternate input buffer (e.g., backup storage unit input buffer). A memory manager monitors space available and shows space available in both input buffers. Data 'L' is transferred from primary storage input buffer to volume storage 1804 and is stored along with data 'A', 'B', 'C', 'D', 'E', 'F', 'G', 'H', 'I', 'J', and 'K'. No data is stored in primary storage input buffer 1800. No data is stored in backup storage input buffer 1802. Memory manager notes data locations. Index in primary storage unit notes memory locations used and data in the locations. Index in backup storage unit notes memory locations used and data in the locations.

Figure 19:
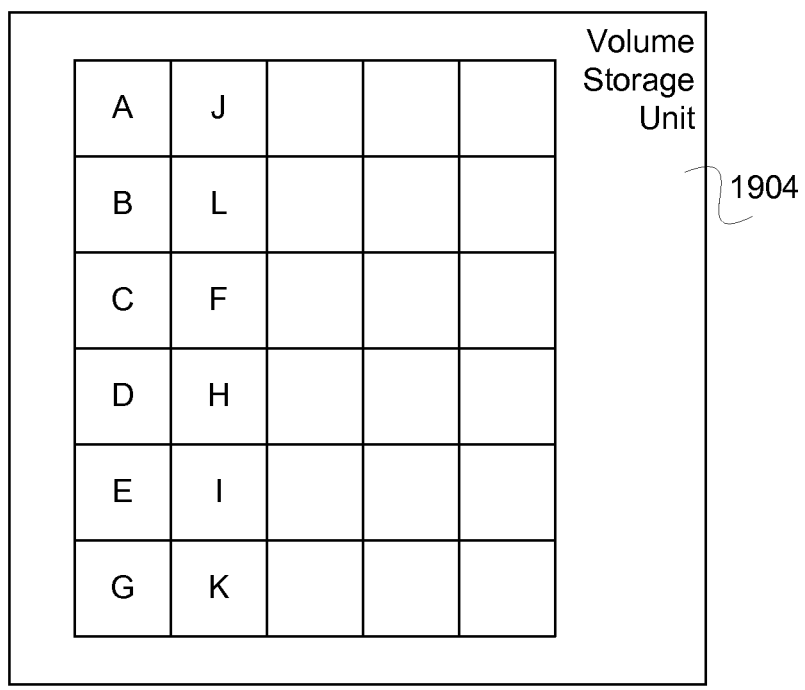
FIG. 19 is a diagram illustrating an embodiment of resolving write pressure.

FIG. 19 is a diagram illustrating an embodiment of resolving write pressure. In some embodiments, the system shown in FIG. 19 represents volume storage unit 204 of FIG. 2. In the example shown, data (e.g., represented by symbols 'A'. 'B', 'C', 'D', 'E', 'F', 'G', 'H', 'I', 'F', 'K', 'L') is streamed to be received. Data 'A', 'B', 'C', 'D', 'E', 'F', 'G', 'H', 'I', 'J', 'K', and 'L' are stored in volume storage 1904. Data are stored in order of coming out of primary storage input buffer "first-in, first-out" without reordering as in the example of FIGS. 5-18. Memory manager notes data locations. Index in primary storage unit notes memory locations used and data in the locations. Index in backup storage unit notes memory locations used and data in the locations.

In some embodiments, data is stored in volume storage unit in the order leaving primary storage unit input buffer not order of arrival of data, and the memory manager is used to reorder the data on recall of the data to ensure proper data order on reading of stored data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for resolving write pressure, comprising:
a primary storage unit, wherein the primary storage unit comprises a primary storage unit input buffer and a volume storage unit;
a backup storage unit, wherein the backup storage unit comprises a backup storage unit input buffer and a volume backup storage unit;
a processor to:

in the event that the primary storage unit input buffer is unable to store a first set of input data, store the first set of input data in the backup storage unit input buffer;

transfer the first set of input data to the primary storage unit input buffer as space is available after storing data from the primary storage unit input buffer in the volume storage unit.

2. A system as in claim 1, wherein the processor is further to indicate the first set of input data has been stored.

3. A system as in claim 1, wherein the processor is further to indicate the first set of input data has not been stored in the event that the backup storage unit input buffer is full.

4. A system as in claim 1, wherein transferring the first set of input data comprises storing the first set of input data in the primary storage unit input buffer and removing the first set of input data in the backup storage unit input buffer.

5. A system as in claim 1, wherein the primary storage unit receives a second set of data and stores the second set of data in the primary storage unit input buffer prior to storing the second set of data in the volume storage unit.

6. A system as in claim 1, wherein the primary storage unit input buffer comprises a memory that stores data faster than the volume storage unit.

7. A system as in claim 1, wherein the backup storage unit backs up the primary storage unit.

8. A system as in claim 7, wherein the volume backup storage unit stores backups of the volume storage unit.

9. A system as in claim 1, wherein the backup storage unit comprises a deduplication storage system.

10. A system as in claim 1, wherein the transfer occurs as a primary storage unit input buffer is able to store the set of data.

11. A system as in claim 1, wherein in the event that the primary storage unit input buffer is able to store the first set of data, store the first set of data in the primary storage unit input buffer.

12. A system as in claim 11, wherein the first set of data is transferred from the primary storage unit input buffer to the volume storage unit.

13. A system as in claim 1, further comprising a memory manager, wherein the memory manager manages the storage and transfer of the first set of data.

14. A system as in claim 13, wherein the memory manager tracks a location of storage.

15. A system as in claim 14, wherein the location comprises one or more of the following: a primary buffer location in the primary storage unit input buffer, a backup buffer location in the backup storage unit input buffer, and a volume location in the volume storage unit.

16. A system as in claim 13, wherein the memory manager tracks available storage in one or more of the following: the primary storage unit input buffer, the backup storage unit input buffer, and the volume storage unit.

17. A method for resolving write pressure, comprising:
in the event that the primary storage unit input buffer is unable to store a first set of input data, storing, using a processor, the first set of input data in the backup storage unit input buffer, wherein the primary storage unit comprises a primary storage unit input buffer and a volume storage unit, and wherein the backup storage unit comprises a backup storage unit input buffer and a volume backup storage unit; and transferring the first set of input data to the primary storage unit input buffer as space is available after storing data from the primary storage unit input buffer in the volume storage unit.

18. A computer program product for resolving write pressure, the computer program product being embodied in a non-transitory computer readable storage medium and comprising computer instructions for:
in the event that the primary storage unit input buffer is unable to store a first set of input data, storing, using a processor, the first set of input data in the backup storage unit input buffer, wherein the primary storage unit comprises a primary storage unit input buffer and a volume storage unit, and wherein the backup storage unit comprises a backup storage unit input buffer and a volume backup storage unit; and transferring the first set of input data to the primary storage unit input buffer as space is available after storing data from the primary storage unit input buffer in the volume storage unit.

* * * * *